(12) United States Patent
Tyler

(10) Patent No.: US 12,217,310 B1
(45) Date of Patent: Feb. 4, 2025

(54) DYNAMIC POLICY LIFECYCLE MANAGEMENT

(71) Applicant: Two Sigma Insurance Quantified, LP, New York, NY (US)

(72) Inventor: Jeffrey Tyler, Manhasset, NY (US)

(73) Assignee: Two Sigma Insurance Quantified, LP, New York, NY (US)

( * ) Notice: Subject to any disclaimer, the term of this patent is extended or adjusted under 35 U.S.C. 154(b) by 0 days.

(21) Appl. No.: 17/124,985

(22) Filed: Dec. 17, 2020

Related U.S. Application Data

(60) Provisional application No. 62/949,442, filed on Dec. 17, 2019.

(51) Int. Cl.
| | |
|---|---|
| *G06Q 40/08* | (2012.01) |
| *G06Q 10/101* | (2023.01) |
| *G06Q 30/018* | (2023.01) |
| *G06Q 30/0282* | (2023.01) |
| G06F 16/22 | (2019.01) |

(52) U.S. Cl.
CPC ........... *G06Q 40/08* (2013.01); *G06Q 10/101* (2013.01); *G06Q 30/018* (2013.01); *G06Q 30/0282* (2013.01); *G06F 16/22* (2019.01)

(58) Field of Classification Search
CPC .... G06Q 40/08; G06Q 10/101; G06Q 30/018; G06Q 30/0282; G06F 16/22
USPC ....................................................... 705/3–44
See application file for complete search history.

(56) References Cited

U.S. PATENT DOCUMENTS

| | | | | |
|---|---|---|---|---|
| 5,655,085 | A * | 8/1997 | Ryan ...................... | G06Q 40/02 705/4 |
| 8,589,190 | B1 * | 11/2013 | Pugh ...................... | G06Q 40/08 463/25 |
| 8,788,295 | B1 * | 7/2014 | Wargin .................. | G06Q 40/08 705/4 |
| 10,497,250 | B1 * | 12/2019 | Hayward ................. | G06N 3/08 |
| 2013/0191168 | A1 * | 7/2013 | Klimek .................. | G06Q 40/08 705/4 |
| 2014/0165136 | A1 * | 6/2014 | Ozawa .................. | H04L 63/205 726/1 |
| 2015/0178849 | A1 * | 6/2015 | Berger .................. | G06Q 40/08 705/4 |

(Continued)

OTHER PUBLICATIONS

RentShield: Services, a key to Risk-FREE Income, www.rentshield.com/guarantee.php Feb. 22, 2006.*

*Primary Examiner* — Frantzy Poinvil
(74) *Attorney, Agent, or Firm* — Wolf, Greenfield & Sacks, P.C.

(57) ABSTRACT

Systems and methods are disclosed for dynamic policy lifecycle management. In one implementation, one or more specifications are processed with respect to one or more first product requirements to configure a first product model with respect to a first tenant. A first request is received from a first user and the first product model is identified based on the first request. A first policy instance is generated in association with the first product model. A second product model is generated with respect to the first tenant. A second request is received, including a request to change one or more aspects of the first policy instance. In response to the second request, an operation with respect to the first policy instance is initiated based on the association between the first policy instance and the first product model.

20 Claims, 7 Drawing Sheets

(56) References Cited

U.S. PATENT DOCUMENTS

| | | | |
|---|---|---|---|
| 2015/0379442 A1* | 12/2015 | Samanthapudi | G06Q 10/0633 705/7.27 |
| 2016/0063638 A1* | 3/2016 | Brantley | G06Q 40/08 705/4 |
| 2018/0336638 A1* | 11/2018 | Dziabiak | G06F 7/026 |
| 2021/0158451 A1* | 5/2021 | Blazek | G06Q 40/08 |
| 2021/0158811 A1* | 5/2021 | Di Fabbrizio | G10L 13/00 |
| 2021/0279852 A1* | 9/2021 | Jakka | G06T 7/20 |

* cited by examiner

DYNAMIC POLICY LIFECYCLE MANAGEMENT

CROSS-REFERENCE TO RELATED APPLICATION

This application is related to and claims the benefit of U.S. Patent Application No. 62/949,442, filed Dec. 17, 2019, which is incorporated herein by reference in its entirety.

TECHNICAL FIELD

Aspects and implementations of the present disclosure relate to data processing and, more specifically, but without limitation, to dynamic policy lifecycle management.

BACKGROUND

Existing technologies maintain incompatible data models for different versions of the same product. After a policy is generated based on such a product, it may be difficult or impossible to make subsequent changes to the policy.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
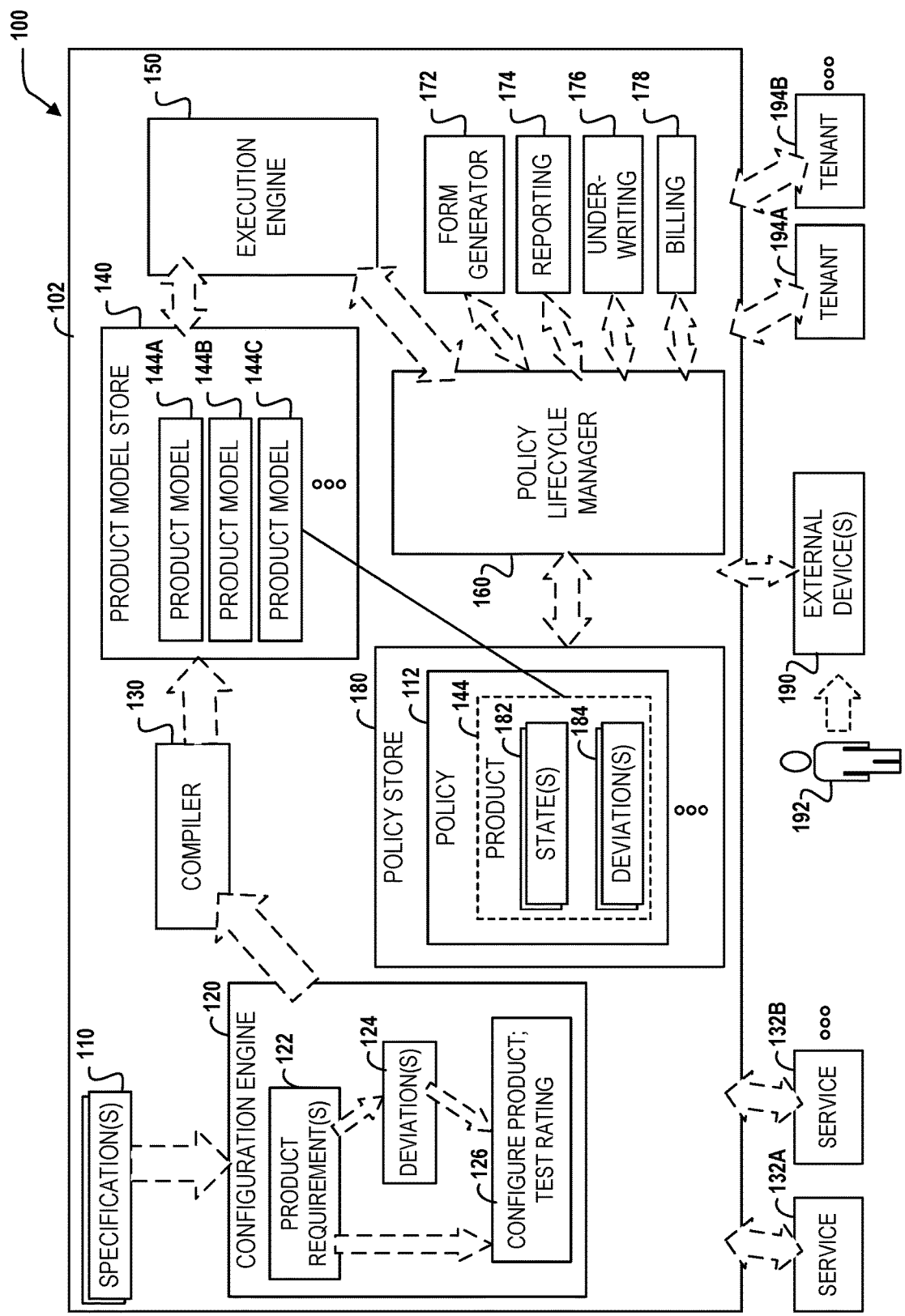
FIG. 1 illustrates an example system, in accordance with an example embodiment.

Aspects and implementations of the present disclosure are directed to dynamic policy lifecycle management.

The described technologies enable integrated insurance policy underwriting and insurance product-independent lifecycle management. In certain implementations, implementing the described technologies can enable systems to dynamically maintain and utilize policies written from a multitude of insurance products and/or different versions of the same insurance product.

Additionally, the described technologies can enable customization of rules associated with policy underwriting. Such rules can change over time and can differ across policies, even with respect to same product. Additionally, the described technologies can enable users to efficiently compare policies across based on numerous data inputs before selecting a specific data input. Moreover, in certain implementations the described technologies maintain logs of previously generated quotes and their associated parameters. Accordingly, subsequent queries can be processed in relation to such stored quotes, and further configurations and customizations can be initiated based on the stored data. Doing so can further enhance and improve aspects of the described technologies, including but not limited to rating and underwriting algorithms and other operations.

Though existing technologies do enable basic policy management functions, significant inefficiencies and shortcomings remain. For example, existing policy management systems conjoin the management of different products with the lifecycle of policies. Significant inefficiencies therefore result in numerous scenarios, such as with respect to managing versions of the same product. Additionally, existing technologies maintain incompatible data models for different versions of the same product and/or different versions of the methods for performing data operations (as defined for versions of the product). Maintaining such policies is difficult because changes cannot be made to data of the policy (since the methods operating on these policies may have changed in subsequent versions and unexpected errors may arise).

Moreover, existing policy management processing systems render data models of insurance products into static data stores. As a result, attempts made with respect to different data inputs are not maintained and their results thus cannot be easily compared before choosing a particular set of inputs/parameters for the insurance product.

Accordingly, as described in detail herein, the disclosed technologies enable integrated dynamic policy underwriting and product-independent lifecycle management. In doing so, the described technologies can be easily configured with respect to policies generated based on numerous products and/or policies generated based on different versions of the same product. Additionally, in certain implementations the described technologies can enable valuable insights to be generated, preserved, and leveraged in generating additional policies and products.

These and other described features can be implemented with respect one or more particular machine(s), including server(s) and/or cloud-based services. As described in detail herein, the described technologies improve the functioning of the referenced machine(s) and/or otherwise enhance numerous technologies including enabling the efficiency, output, and dynamic-nature of the disclosed operations, as described herein.

FIG. 1 illustrates an example system 100, in accordance with some implementations. As shown in FIG. 1, system 100 can include server 102. Server 102 can be, for example, a server computer, computing device, storage service (e.g., a 'cloud' service), etc. that enables various operations described herein. In certain implementations, such operations can include communications with one or more other machines, devices, etc. It should be understood that the various devices and machines described and depicted herein can connect to and/or otherwise communicate with one another via various network connections and/or other such communication protocols such as the Internet, a wide area network (WAN), a local area network (LAN), a virtual private network (VPN), an intranet, and the like.

As shown in FIG. 1, server 102 can be configured to communicate with various external services such as service 132A, service 132B, etc. (collectively, service(s) 132). Such services can be for example, external or third-party services that provide information to server 102. Examples of such services include but are not limited to rating services (such as those that provide structured content and other data relating to and/or reflecting various products such as insurance products), actuarial services, third-party credit-rating services, identity-verification services, property ownership registries, and/or other services that provide various data, feedback, backend services, etc., that may be relevant to various operations described herein. In certain implementations, service(s) 132 can generate and/or provide specification(s) 110.

Each of the referenced specification(s) 110 can be, for example, a data structure or other such element that includes or otherwise reflects various aspects, parameters, and/or other information pertaining to product(s) (e.g., insurance products). In certain implementations, such specifications 110 can incorporate elements such as computational model(s), data model(s), rating elements (e.g., rating flowchart(s)), validation elements (e.g., validation flowchart(s)), form elements (e.g., form flowchart(s)), and/or other elements utilized to generate and/or represent a product. By way of illustration, an example specification 110 can include or reflect aspects or parameters of an auto insurance product (e.g., an auto insurance product that complies with applicable regulations in a given region/state, an auto insurance product that complies with applicable regulations in a given region/state for a particular time period, etc.).

As also shown in FIG. 1, server 102 can be configured to communicate with various tenants such as tenant 194A, tenant 194B, etc. (collectively, tenant(s) 194). In certain implementations, such tenant(s) 194 can be external services, systems, entities, etc., that provide services such as insurance-related services. In one example scenario, tenant 194A can be a first entity, carrier, etc. that provides various types of insurance (e.g., auto insurance, homeowner's insurance, etc.), while tenant 194B can be a second entity, carrier, etc. that provides various types of insurance.

In certain implementations, each of the referenced tenants 194 can provide products (e.g., insurance products) based on/in accordance with the referenced specifications 110. For example, a given specification can include or reflect parameters of an auto insurance product for a given region/state in a particular time period, etc. Different tenants (e.g., tenant 194A and tenant 194B) may each provide their own respective insurance products that are generated based on and/or are configured with respect to the same specification. For example, tenant 194A may customize or configure the referenced specification to provide an auto insurance product that further conforms to its own processes, requirements, rules, etc., while tenant 194B can configure or customize the same specification in a different way. In certain implementations, such configuration operations can be performed by configuration engine 120.

Figure 6:
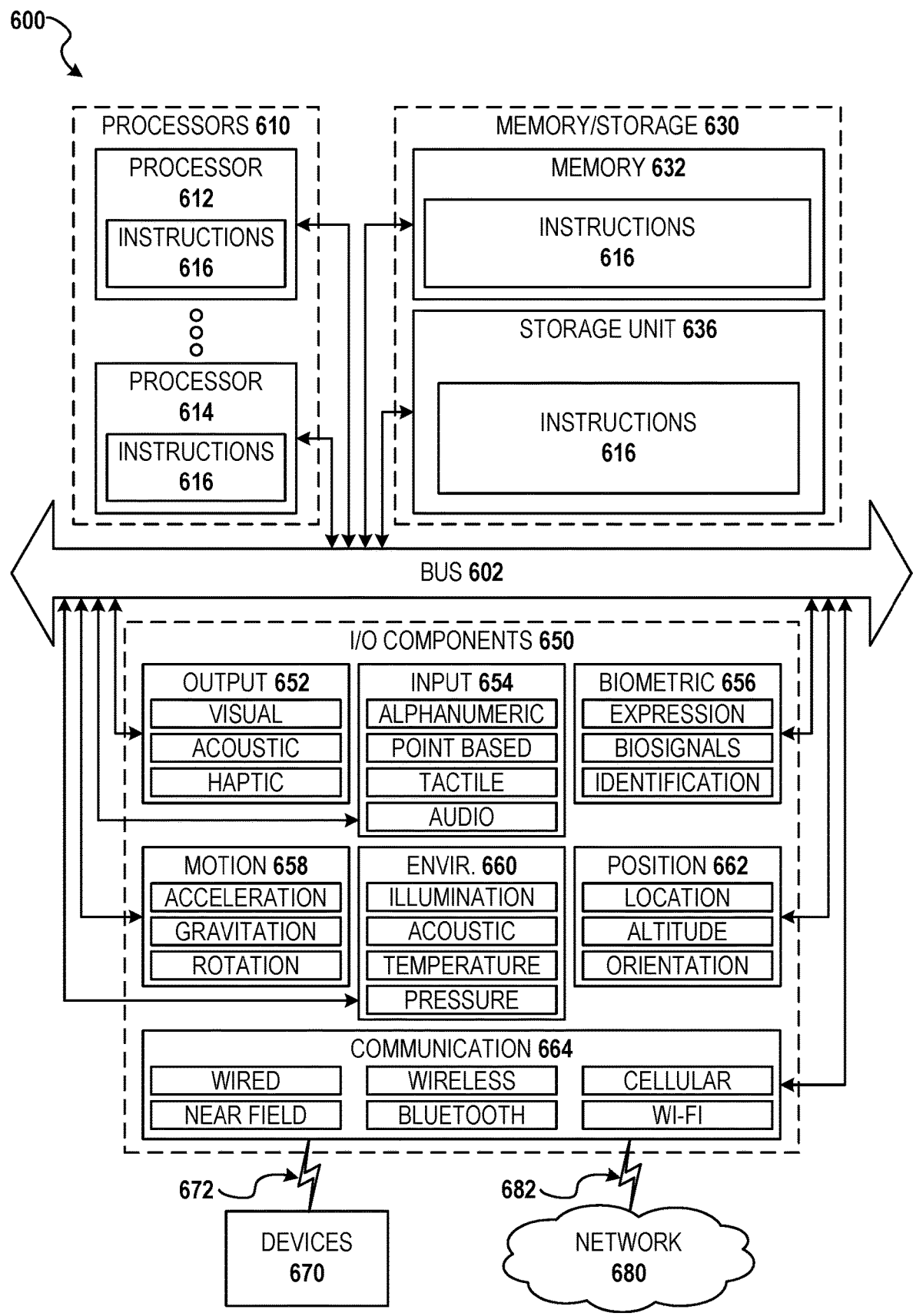
FIG. 6 is a block diagram illustrating components of a machine able to read instructions from a machine-readable medium and perform any of the methodologies discussed herein, according to an example embodiment.

Configuration engine 120 can include one or more programs, modules, or other executable instructions that configure/enable server 102 to perform one or more operations such as are described herein. Such instructions or programs can be stored in memory of server 102 (e.g. memory 630 as depicted in FIG. 6 and described below). One or more processor(s) of server 102 (e.g., processors 610 as depicted in FIG. 6 and described below) can execute such instructions(s). In doing so, server 102 can be configured to perform various operations, as described herein.

For example, configuration engine 120 can receive or otherwise access specification(s) 110. As noted, such specifications 110 can be received and/or otherwise originate from external service(s) 132. Moreover, such specifications can include or otherwise reflect structured representations and/or other aspects, parameters, or other information pertaining to product(s) such as insurance products.

Configuration engine 120 can further process such a specification with respect to parameters or other requirements provided by and/or originating from one or more tenant(s) 194. By way of illustration, as shown in FIG. 1, configuration engine 120 takes specification(s) 110 (e.g., of an insurance product) and customizes various characteristics such as the data model and operations on this data model, in accordance with parameters, requirements, and/or other configurations provided by a particular tenant (e.g., a carrier that provides an insurance product consistent with a particular specification). For example, configuration engine 120 can process the referenced specification(s) 110 (e.g., specifications associated with an insurance product, which can originate from one or more third-party sources 132) to generate, based on such specification(s), an insurance product that is further configured with respect to a particular carrier. In doing so, one or more product requirement(s) 122 can be received (e.g., from a particular tenant 194) and/or generated (e.g., based on previously received requirements and/or other data). Such product requirement(s) 122 can reflect carrier-specific requirements, configurations, etc. for an insurance product provided by a particular carrier in accordance with the referenced specification.

Using such requirements 122, configuration engine 120 can further determine or otherwise compute various deviation(s) 124. Such deviations 124 can include, for example, deviations from the underlying specification 110. For example, while a given specification may include form(s) that request certain fields of data from a user (e.g., name, address, phone number), the product requirement(s) 122 of a particular carrier may deviate from such a specification by requiring additional field(s) (e.g., occupation, income, etc.). It should be understood that a particular deviation may be associated with a given specification or may be utilized across multiple specifications/products (e.g., for a carrier that makes comparable configurations across multiple products).

Using the referenced specification(s) 110, product requirement(s) 122 and deviation(s) 124, configuration engine 120 can further configure a product (e.g., an insurance product) and/or can test rating(s) associated with the referenced specification 126. For example, as described herein, configuration engine 120 can process a specification 110 (reflecting parameters of an insurance product) based on product requirements 122 and/or deviations 124 originating from/associated with a particular carrier 194 to configure an insurance product that is both consistent with the underlying specification and configured in accordance with the specific requirements of the carrier. Configuration engine 120 can further test various aspects of the rating of the configured product (e.g., to ensure they conform with requirements of the specification and/or the carrier), as described herein.

While configuration engine 120 (and various other elements described herein) is depicted and/or described as operating on server 102, this is only for the sake of clarity. However, in other implementations such elements can also be implemented on other devices/machines. For example, in lieu of executing locally at server 102, aspects of configuration engine 120 (and/or any other elements or components or server 102) can be implemented remotely (e.g., on another server device or within a cloud service or framework).

Additionally, while many of the examples described herein are illustrated with respect to multiple machines or components, this is simply for the sake of clarity and brevity. However, it should be understood that the described technologies can also be implemented (in any number of configurations) with respect to a single computing device/service.

As also shown in FIG. 1, server 102 can include compiler 130. Compiler 130 can be an application, module, set of instructions, etc., such as a product compiler as described herein. In certain implementations, compiler 130 can be configured to receive or otherwise access one or more product(s). Such product(s) can include, for example, configured insurance product(s) generated by/originating from configuration engine 120. Compiler 130 can further process such a product, e.g., to produce or generate a product model such as product model 144A, product model 144B, etc. (collectively product model(s) 144), such as are depicted in FIG. 1 and described herein. Such a product model 144 can be an intermediate representation that reflects, for example, input(s), output(s), constraint(s), rate tables, form(s), view(s), scenario(s), and/or other elements that make up or reflect a product (e.g., as such product was configured at a particular point in time). Such an intermediate product representation/model (e.g., as generated by compiler 130) can be provided to and/or stored within product model store 140. Product model store 140 can be a storage resource such as an object-oriented database, a relational database, a decentralized or distributed leger (e.g., blockchain), etc., which contains model(s) and/or other such representations (e.g., immutable intermediate representations) of various insurance products, as described herein. In certain implementations, product model store 140 can maintain different representation(s) for different versions of the same insurance product. For example, as shown in FIG. 1, product model 144A and product model 144B can each be representations of different versions of a single product (e.g., an auto insurance product). Such versions may be generated at different points in time and thus may reflect various differences (despite being versions of the same underlying product). As described herein, such models/representations (and/or elements or artifacts thereof) can be used in generating additional insurance product(s), policies, etc. and/or performing related operations.

It should be understood that the referenced product can include but is not limited to a data structure or element that includes or otherwise incorporates/references various constraints, business rules, pricing information, rules, conditions, etc., e.g., as pertaining to an insurance offering. By way of illustration, an example product can include an auto insurance product for a particular state for a particular year, reflecting rules associated with such an offering, pricing information, etc.

Figure 2:
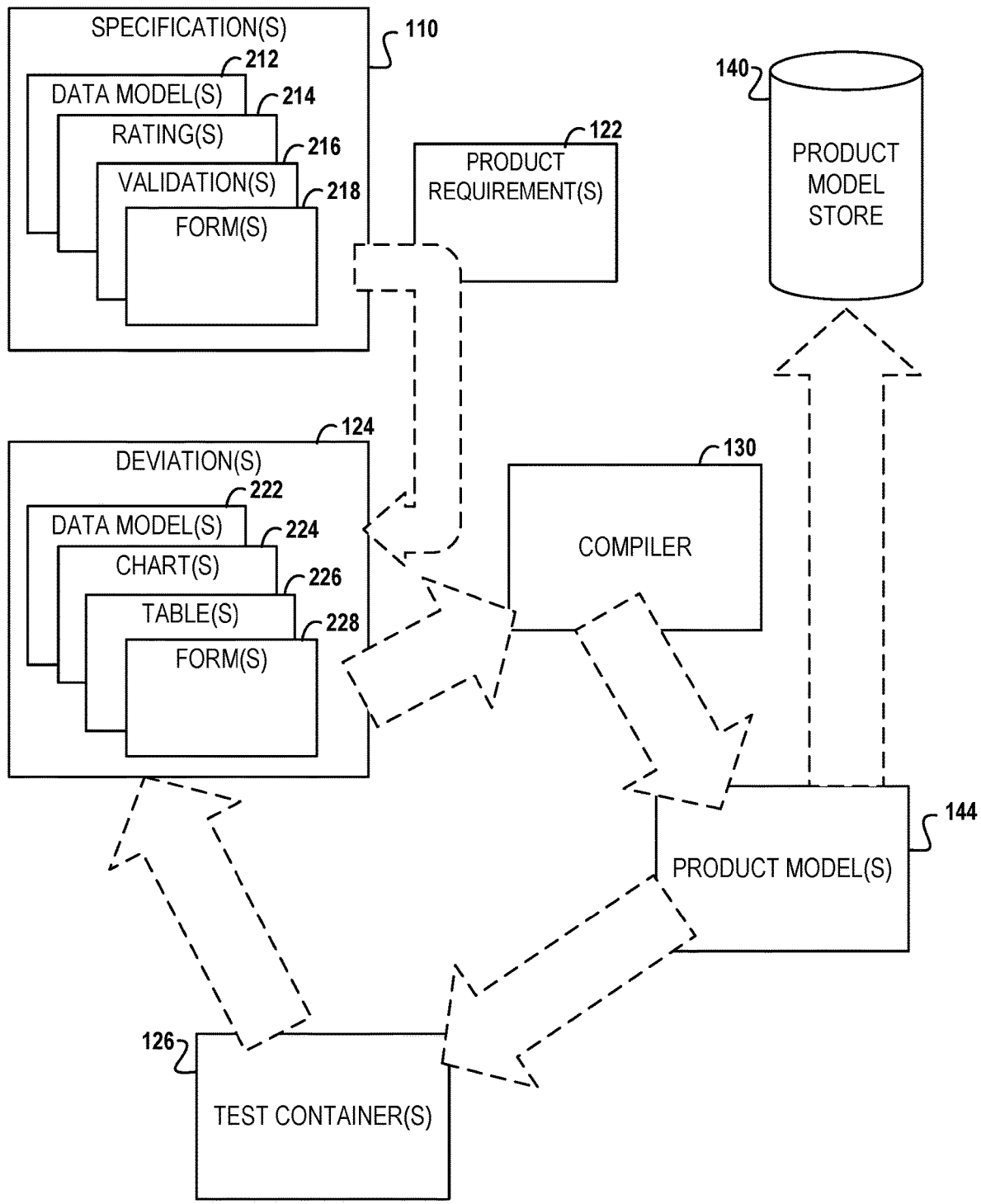
FIG. 2 depicts further aspects and implementations of the described technologies.

Further aspects of the operation of compiler 130 are depicted in FIG. 2. As shown in FIG. 2, specification(s) 110 can be received from various third-party sources. Such specifications 110 can reflect a computational model and can further incorporate elements such as data model(s) 212, rating elements (e.g., rating flowchart(s)) 214, validation elements (e.g., validation flowchart(s)) 216, form elements (e.g., form flowchart(s)) 218, and/or other elements that reflect aspects of one or more product(s).

As shown in FIG. 2, such specifications 110 can be processed (e.g., by configuration engine 120) with respect to product requirement(s) 122 which can reflect carrier-specific configurations of specification(s) 110. In doing so, deviation(s) 124 can be computed or otherwise generated. Such deviations can reflect, for example, aspects in which a particular product deviates from the underlying specification based upon which it is generated or otherwise associated. Examples of such deviations include data model(s) 222, flowchart(s) 224, rate table(s) 226, form(s) 228, and other elements pertaining to aspects of a product or products that may differ from carrier to carrier (e.g., with respect to a particular product, such as an auto insurance product for a particular region/state).

Such product requirement(s)/definition(s) 122 and deviation(s) 124 can be provided as inputs to product compiler 130. Product compiler 130 can process such inputs to produce or generate product model(s) or file(s) 144. Such product model(s)/file(s) can be data structures and/or other elements that include and/or otherwise reflect intermediate representation(s) of a product or products. For example, each product model 144 can be a representation of a version of a product (e.g., an auto insurance product) as generated at a particular point in time. Accordingly, different versions of a single product may be generated at different time(s) and/or under different sets of circumstances, and may reflect underlying change(s) in various aspects of the product, as described herein.

Compiler 130 can further utilize test container(s) and other testing/validation components 126 to process generated product model(s)/file(s) 144. In doing so, such test container(s)/validation components 126 can confirm, verify, etc. that a generated product model/file meets the associated product requirements, conforms to the requirements or parameters reflected in the underlying specification(s) 110, etc. Upon completing such validation/testing, a generated product model/file can be released and stored, e.g., in product model store 140, as described herein.

As shown in FIG. 1, server 102 also includes or incorporates execution engine 150. Execution engine 150 can be an application, service, etc., configured to create or generate policies (e.g., insurance policies). In certain implementations, such policies can be instances of the referenced products and/or representations thereof (e.g., as generated by compiler 130 and maintained in product model store 140). For example, an illustrative policy can be a particular instance of an auto insurance product provided by a particular carrier for a particular region/state as issued to a particular user for a particular time period based on a defined set of parameters.

By way of further illustration, in certain implementations, server 102 can receive one or more requests originating from users and/or devices, such as user 192 and device 190 as shown in FIG. 1. Such device(s) can be, for example, a laptop computer, a desktop computer, a terminal, a mobile phone, a tablet computer, a smart watch, a wearable device, a connected device, a server, and the like. The referenced user can be a human user or administrator who interacts with respective device(s). For example, user 192 can provide various inputs (e.g., via an input device/interface such as a keyboard, mouse, touchscreen, microphone, etc.) to device(s) 190. Device(s) 190 can also display, project, and/or otherwise provide content to user 192 (e.g., via output components such as a screen, speaker, etc.). As described herein, user 192 can, for example, request a quote for an insurance product, request to generate a new policy or update an existing policy, and/or initiate other operations described herein.

In response to such a request, execution engine 150 can be invoked with respect to one of the referenced product models 144 (e.g., as generated by compiler 130 and maintained in product model store 140). For example, in response to a request to generate a policy, execution engine 150 can create or generate a policy 112 as an instance of the referenced insurance product(s) represented in a given product model 144. By way of illustration, as shown in FIG. 1, policy 112 can be generated as an instance of product 144 (e.g., an auto insurance product) based on product model 144C (e.g., a 'snapshot' of the parameters of such product at a particular point in time), as described herein. Execution engine 140 can further perform various operations on such policie(s)/instance(s), as described herein.

As also shown in FIG. 1, server 102 can include policy lifecycle manager 160. Policy lifecycle manager 160 can be an application, module, service, etc., configured to instantiate policies, e.g., based on different models in the product model store 140. In certain implementations, policy lifecycle manager 160 can be configured to operate in a manner that is independent of a particular insurance product, as described herein. Additionally, in certain implementations, policy lifecycle manager 160 can be configured to perform various policy-related transactions, e.g., with respect to instantiated policie(s).

In certain implementations, the described technologies can further incorporate additional elements or components. For example, a document management/form generator component 172 can be configured to manage form templates and/or to generate forms. Such templates/forms can correspond to information to be solicited/received from user 192 and/or obtained from other sources. Additionally, in certain implementations such templates, forms, etc. can be generated based on mapping fields in certain forms (e.g., as reflected in specification(s) 110) to specific fields of the product model(s)/intermediate product representation(s) 144.

By way of further example, server 102 can further include various integration module(s). Such modules can, for example, be configured to incorporate additional functions related to the management of generated policie(s). Examples of such integration modules include modules that enable further operations such as policy billing, report generation and data export.

For example, in certain implementations, policy lifecycle manager 160 can be configured to perform or enable various operations and transactions with respect to a specific policy (e.g., policy 112 as depicted in FIG. 1 and described herein). In certain implementations, such operations can be performed in accordance with the underlying or associated product model based upon which the referenced policy was generated. For example, in the scenario depicted in FIG. 1, such operations can be performed with respect to policy 112 based on product model 144C (that is, the version or representation of product 144 based upon which policy 112 was generated).

By way of further illustration, in certain implementations, the described technologies can be configured to configure product(s) (e.g., insurance products) in various ways. For example, a carrier can define specific data fields relevant to a product, and/or operations which write supplied inputs to elements of the instances of corresponding policies. Additionally, a carrier can configured insurance-specific operations (e.g., storing carrier-configurable data input into instances, storing vendor data and rating of instances of the product, etc.) or other such transactions that can be performed with respect to a policy.

Examples of such operations/transactions that can be performed on/in relation to a policy include but are not limited to: generating form(s) or other document(s) associated with an insurance policy (e.g., using a document management component) (172), performing various reporting operations (174), configuring underwriting rule(s) for a policy and/or performing underwriting transactions on the policy as prescribed by the underwriting rules (176); and performing various billing-related operations (178). Additionally, in certain implementations policy lifecycle manager 160 can be configured to query various external data sources, e.g., to incorporate or account for information in accordance with the requirements of the product model associated with the referenced policy.

It should be understood that these components, modules, and operations are provided by way of illustration and that yet other components can also be incorporated or otherwise integrated.

In certain implementations policy lifecycle manager 160 can generate and maintain a policy, such as policy 112 as shown in FIG. 1. Such a policy 112 can reflect a specific instance of an insurance product (e.g., an auto insurance product) issued to a user 192 by a carrier (e.g., carrier 194A). Policy 112 can incorporate aspects of certain specification(s) that reflect the product 144 as modified or configured based on various deviations 184 (reflecting customizations, etc., originating from the carrier which can pertain to requirements associated with specific regions, business lines, etc.).

Policy 112 can also include multiple state(s) 182. Such states can define or dictate the manner in which various operations are performed on the policy, e.g., by policy lifecycle manager 160. For example, the referenced states 182 can define operations that can be performed with respect to a particular policy in a particular state, the manner in which a policy can transition from one state to another, etc.

Additionally, in certain implementations policy lifecycle manager 160 can be further configured to generate and maintain link(s) and/or other such association(s) between a policy instance (e.g., as stored in policy store 180) and the immutable product definition (e.g., as stored in product model store 140) which was instantiated to generate/produce this instance. For example, as shown in FIG. 1, policy 112 (as stored in policy store 180) can be linked or associated with product model 144C (as stored in product model store 140).

Creating and maintaining such link(s) between a policy instance and the product model based upon which it was generated can provide numerous advantages and efficiencies. For example, certain aspects of a particular product may change under various circumstances. By way of illustration, a carrier may make certain adjustments to the manner in which it rates or underwrites a particular product. Accordingly, policies generated based on such a product at different points in time may entail different parameters. As such, the described technologies can generate and maintain the described product models 144 as snapshots or representations of different versions (e.g., of a single product). A product model associated with a policy can thus reflect aspects of the policy as it was at the time the policy was issued. In doing so, the described technologies further enable the ability to make changes, updates, etc. to a policy while maintaining other context(s) such as rating algorithms, underwriting rules, explainability, etc., e.g., as they were at the time the policy was issued. Though such parameters may be changed by the carrier (e.g., in subsequent versions), by maintaining the product model the described technologies can enable subsequent policy operations while ensuring such operations are consistent with the underlying product version based upon which the policy was generated.

In certain implementations, policy lifecycle manager 160 can be further configured to capture and maintain logs of various operations performed with respect to a policy, such as edit and transition history of a policy. For example, policy store 180 can maintain the result(s) of transaction(s) performed with respect to an instance of the policy, and such results can further be maintained both separately and in connection with results of other transactions. In doing so, the described technologies can further enable users to perform projects and other experimentation with respect to different rating formulas, underwriting rules, and other variables, as described herein.

By way of further illustration, in certain implementations the referenced underwriting configuration component 176 can enable a user to specify various underwriting rules, including those supplied by an insurance carrier and/or other third parties. By separating the underwriting rules as a configurable component, the described technologies can further enable the association of different underwriting rules, e.g., for policies which may be instances of the same insurance product. For example, in a scenario in which a carrier changes its underwriting rules at different points in time, a policy generated based on a particular product at one time (e.g., one product version/model) may generate one result/outcome, while a policy generated based on the same product at another time (e.g., another product version/model) may generate a different result.

Figure 3:
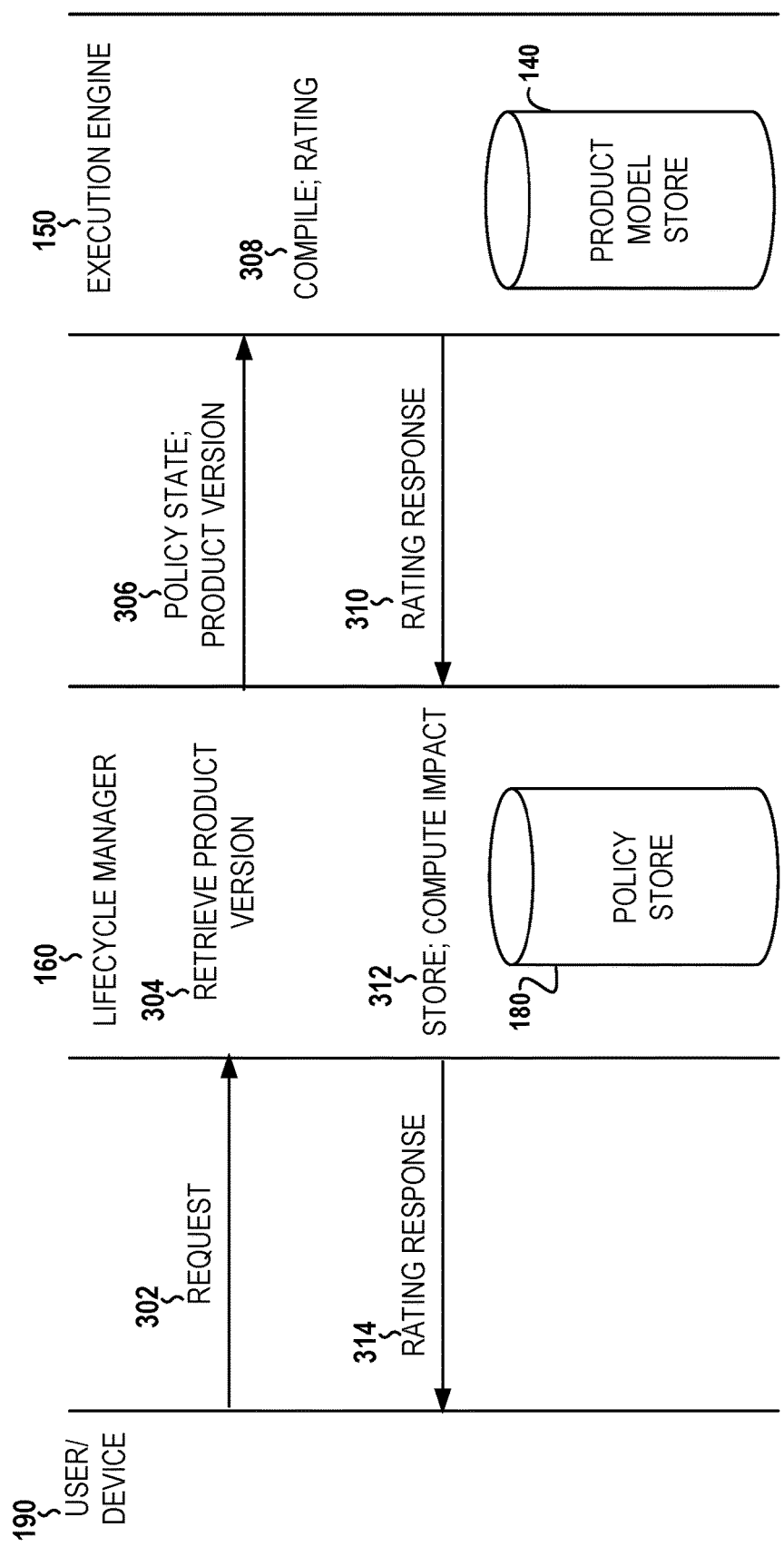
FIG. 3 depicts further aspects and implementations of the described technologies.

FIG. 3 depicts an example transaction, illustrating aspects of operations described herein. As shown in FIG. 3, a user/device 190 (e.g., an end user seeking to generate a quote for an insurance policy) can provide a request (e.g., for a policy quote) (302). Policy lifecycle manager 160 receives the request and retrieves a product version, e.g., of affected policie(s) associated with such a request (304). The policy state, product version, and/or other parameters or data can be retrieved and provided to execution engine 150 (306). Execution engine 150 can then load and compile the product file/model, e.g., with the matching version (e.g., as retrieved from product model store 140) and a rating response can be generated (e.g., by execution engine 150) (308). Such a rating response can be provided to policy lifecycle manager 160 (310). Policy lifecycle manager 160 can store the received rating response (e.g., within policy store 180) and can further compute the impact (e.g., financial impact) in relation to prior transactions (312). Additionally, policy lifecycle manager 160 can provide the referenced rating to user/device 190 (314).

Figure 4:
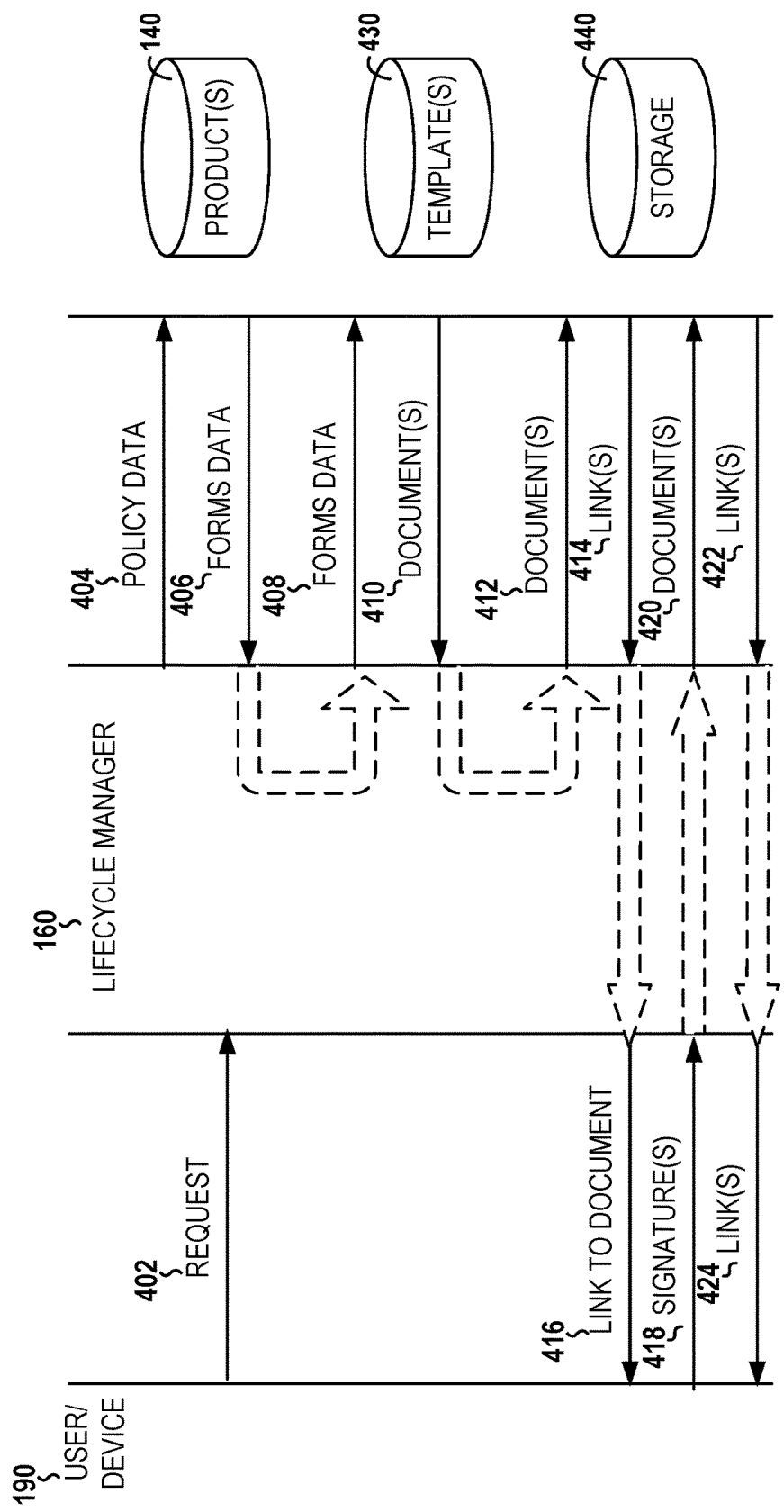
FIG. 4 depicts further aspects and implementations of the described technologies.

FIG. 4 depicts an example transaction, illustrating aspects of operations described herein. As shown in FIG. 4, a user/device 190 (e.g., an end user seeking to generate a quote for an insurance policy) can provide a request for a quote (402). Policy lifecycle manager 160 can receive such a request and can retrieve a product model/version, e.g., of affected policie(s) associated with such a request (404). Forms data corresponding to such product model(s) can be retrieved and provided to policy lifecycle manager (406). Policy lifecycle manager 160 can then utilize such forms data (in conjunction with various templates 430 and highlight logic associated with change(s) to the referenced product model(s)) (408) to generate document(s) (e.g. PDF documents) (410) which can be stored (e.g., in document storage 440) (412). Additionally, in certain implementations such documents can be provided (e.g., via URLs or other such links) (416) to user(s) to electronically sign (418). Such signed document(s) can then be provided/received and further stored (420) and link(s) to such stored documents can be provided/received (422, 424), e.g., for reference.

It can be appreciated that the described technologies provide numerous technical advantages and improvements over existing technologies. For example, the described technologies can improve the functioning of one or more machine(s) (including but not limited to the described devices, servers, services, and/or other machines) by providing enhanced functionality, security, efficiency, and automated management capabilities, as described herein. In contrast, existing technologies are incapable of enabling performance of the described operations in a manner that ensures their efficient execution, while also maintaining the security and integrity of such transactions, as described herein.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 5A:
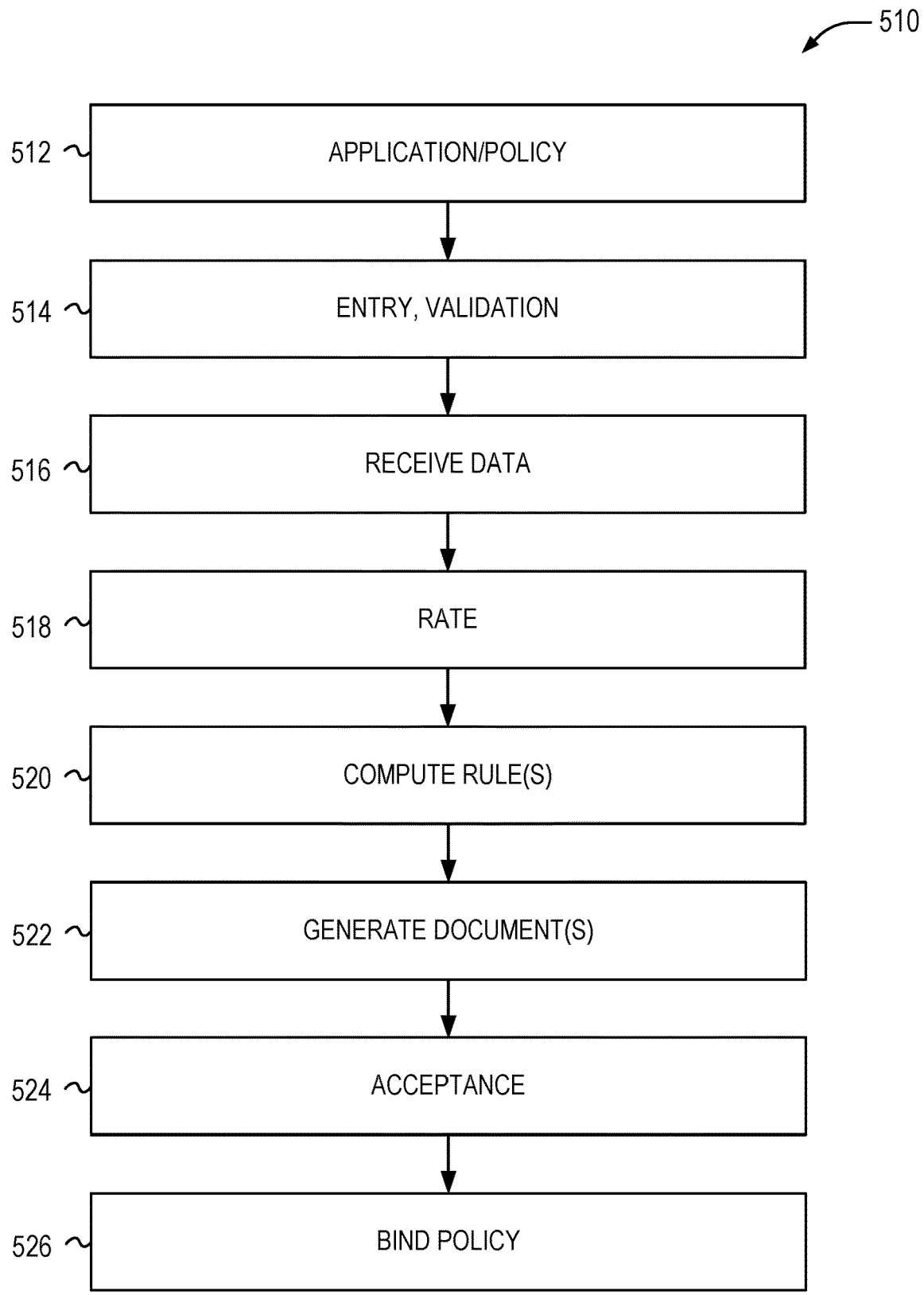
FIG. 5A is a flow chart illustrating aspects of a method for dynamic policy lifecycle management, in accordance with an example embodiment.

FIG. 5A is a flow chart illustrating a method 510, according to an example embodiment, for dynamic policy lifecycle management. The method is performed by processing logic that can comprise hardware (circuitry, dedicated logic, etc.), software (such as is run on a computing device such as those described herein), or a combination of both. In one implementation, the method 510 is performed by one or more elements depicted and/or described in relation to FIG. 1 (including but not limited to server 102), while in some other implementations, the one or more blocks of FIG. 5A can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 512, a new policy application can be initiated, as described herein. Alternatively, in certain implementations a previously bound policy can be accessed. For example, user 192 can initiate a request for a quote for a policy via device 190.

At operation 514, data entry can be performed. For example, user 192 can provide input(s) corresponding to information to be processed in order to generate a quote and/or policy, e.g., via device 190. The received inputs can be reviewed and/or validated, as described herein.

At operation 516, vendor data can be requested and/or received (e.g., from third-party data sources). For example, the described technologies can request data from third-party services 132 (e.g., services that provide specifications 110, credit-rating services, identity verification services, etc.).

At operation 518, a policy can be rated. For example, in certain implementations the received specification(s) 110 (which can correspond to structured representations of insurance product(s)), and/or other received data can be processed (e.g., by configuration engine 120). In doing so, a product definition can be generated, as described herein. Such a product definition can be compiled (e.g., by compiler 130) into a product model which can be an immutable representation of a product (e.g., as stored at product model store 140). A policy instance associated with such a model (i.e., the immutable representation of the product) can be generated, as described herein.

At operation 520, underwriting rules can be computed (e.g., with respect to the associated product model) and errors (or other 'flags') can be reviewed/resolved.

At operation 522, document(s) for the generated policy can be generated, e.g., as described herein.

At operation 524, a policy quote can be provided, presented, and/or accepted, e.g., with respect to user 192 via device 190.

As noted, in certain implementations the described operations can be implemented with respect to requests to change aspects of an existing policy. In such a scenario, a request to change one or more aspects of the policy instance can be received, e.g., from user 192 and provided via device 190. For example, the user may request to change one or more parameters associated with a previously issued policy.

Based on the association between the policy instance (e.g. policy 112 as shown in FIG. 1) and the immutable representation of the product (e.g., product model 144C), a change can be initiated with respect to the policy instance. Such operations can be performed in accordance with the version of the product as reflected in product model 144C. Doing so can provide considerable efficiencies and advantages by enabling the described technologies to change various aspects of existing policies (based on current data and parameters) without necessitating the re-computation and regeneration of the entire policy (e.g., in a scenario where aspects of a product change over time).

At operation 526, a policy (or changes to a policy) can be bound, as described herein.

Figure 5B:
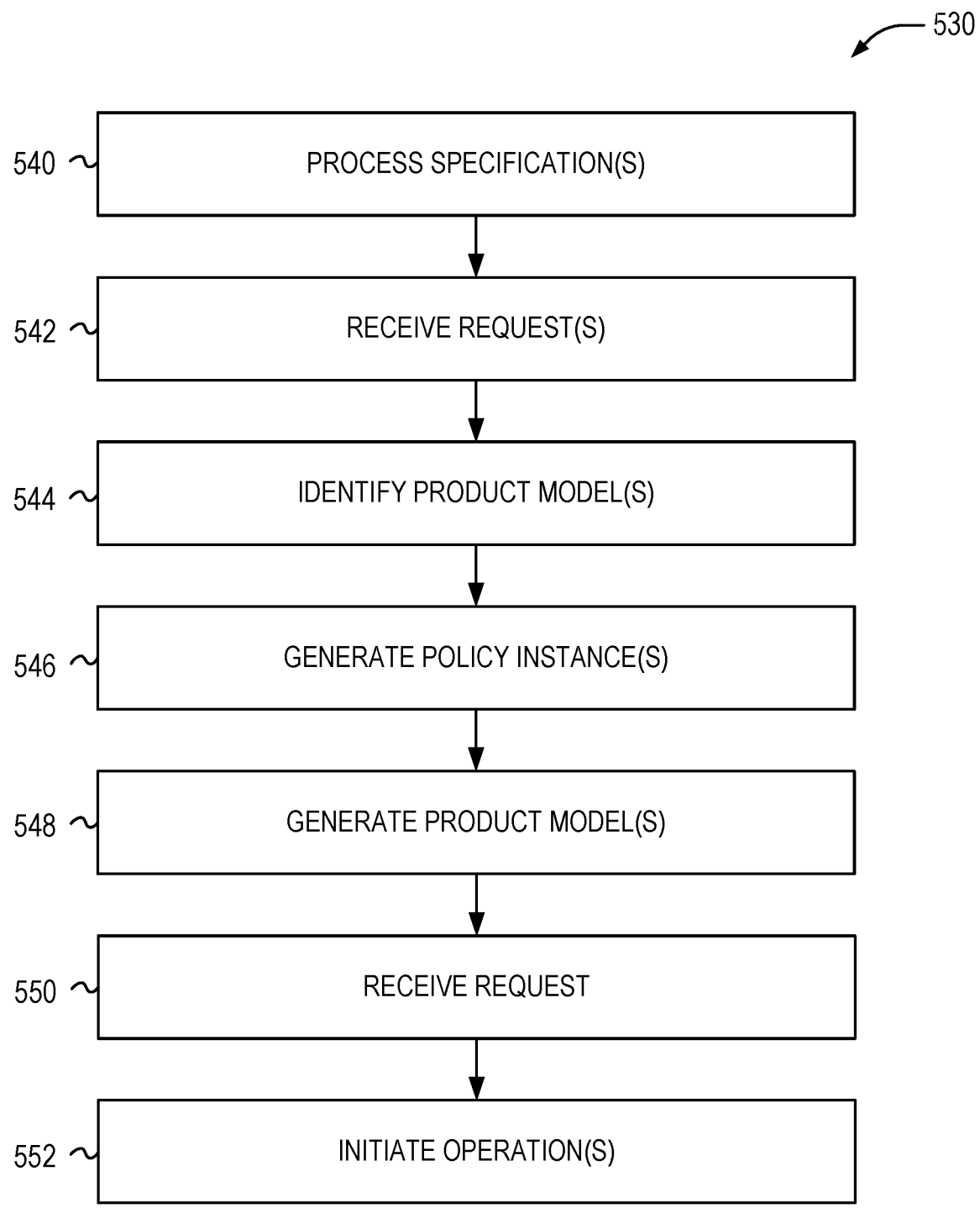
FIG. 5B is a flow chart illustrating further aspects of a method for dynamic policy lifecycle management, in accordance with an example embodiment.

FIG. 5B is a flow chart illustrating a further method 530, according to an example embodiment, for dynamic policy lifecycle management. The method is performed by processing logic that can comprise hardware (circuitry, dedicated logic, etc.), software (such as is run on a computing device such as those described herein), or a combination of both. In one implementation, the method 530 is performed by one or more elements depicted and/or described in relation to FIG. 1 (including but not limited to server 102), while in some other implementations, the one or more blocks of FIG. 5B can be performed by another machine or machines.

At operation 540, one or more specifications are processed. In certain implementations, such specifications 110 can be processed with respect to one or more first product requirements 122 (e.g., product requirements or other parameters associated with/originating from a first tenant 194). In doing so, a first product model can be configured, e.g., with respect to a first tenant. For example, as shown in FIG. 1 and described in detail herein, configuration engine 120 can process specifications 110 with respect to product requirement(s) 122 originating from a carrier (e.g., tenant 194A) to configure a product model (e.g., product model 144C) that reflects a product provided by the referenced tenant. Various other operations (e.g., testing, rating, validation, etc.) can also be performed, as described herein.

At operation 542, a first request can be received, e.g., from a first device 190 and/or user 192. Such a request can include or reflect, for example, a request for a quote for a policy.

At operation 544, the first product model (e.g., the product model configured at 540) can be identified, e.g., based on the first request (e.g., the request received at 542), as described herein. For example, the referenced product model 144C can be identified as a product that conforms to various parameters contained within the referenced request.

At operation 546, a first policy instance is generated. In certain implementations, such a policy instance (e.g., policy 112 as shown in FIG. 1) can be generated in association with and/or stored in relation to the first product model (e.g., the product model configured at 540, such as product model 144C as shown in FIG. 1). Additionally, in certain implementations such a policy can include or reflect an insurance policy between the first user and the first tenant, as described herein. Moreover, in certain implementations such a first policy instance can be generated based on a selection originating from the user (e.g., a selection of a particular policy quote from among several available options).

In certain implementations, various policy generation operations, such as those performed in conjunction with the generation of the first policy instance can be stored or recorded, e.g., in a log. For example, an audit trail reflecting various policy quotes, options, etc. generated by the user can be maintained and utilized (e.g., in generating subsequent policies and/or products).

Additionally, in certain implementations such a second policy instance can be generated based on the first product model, e.g., with respect to a request originating from a second user.

At operation 548, a second product model is generated. In certain implementations, such a second product model can be generated with respect to the first tenant. Such a second product model can reflect another version of the product that can incorporate, for example, various changes to aspects of the product, as described herein.

At operation 550, a second request from the first user is received. Such a second request can include or reflect a request to change aspect(s) of the first policy instance (e.g., the policy instance generated at 546 based on the first product model).

At operation 552, an operation with respect to the first policy instance is initiated, e.g., in response to the second request. In certain implementations, such an operation is initiated based on the association between the first policy instance (e.g., the policy instance generated at 546) and the first product model (e.g., the product model configured at 540). In doing so, such operation(s) can be performed in a manner consistent with the product model at it was at the time the policy was generated (despite the fact the product has since changed, e.g., at 550).

In certain implementations, such an operation can include a product-defined operation on the associated policy, such a operations relating to underwriting, reporting, document/form generation, etc., as described in detail herein.

For example, a rating operation can be initiated based on one or more rating parameters of the first product model. By way of further example, an underwriting operation can be initiated based on one or more underwriting parameters of the first product model. In doing so, product-defined operations can be initiated on a policy in a manner consistent with the product model as it existed at the time the policy was generated, as described herein.

It should be understood that the examples provided herein are intended only for purposes of illustration and any number of other implementations are also contemplated. Additionally, the referenced examples and implementations can be combined in any number of ways.

It should also be noted that while the technologies described herein are illustrated primarily with respect to dynamic policy lifecycle management, the described technologies can also be implemented in any number of additional or alternative settings or contexts and towards any number of additional objectives.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with the accompanying figures are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the non-programmed machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example implementation, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fi® signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 6G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:
   obtaining one or more specifications related to a first insurance product, the specifications configured as one or more data structures containing processor-executable data elements representative of parameters of the first insurance product;
   obtaining tenant requirements of a first tenant, for one or more parameters of the first insurance product;
   processing the one or more specifications with respect to the tenant requirements to configure a first product model with respect to the first tenant, the first product model being a data structure storing a snapshot of parameters of the first insurance product at a first point in time, according to the requirements of the first tenant;
   storing the first product model in a product model store, the product model store configured as an object-oriented database;
   receiving a first request from a first user, the first request including data related to an insurance product;
   identifying the first product model based on the data of the first request;
   generating, using the first product model, a first policy instance based on at least the first request, the first policy instance representing the parameters of the first insurance product according to the requirements of the first tenant;
   receiving a second request from the first user, the second request comprising one or more changes to parameters of the first policy instance;
   in response to the second request, initiating an operation with respect to the first policy instance based on the association between the first policy instance and the first product model, to analyze the one or more changes to the parameters of the first policy instance;
   displaying results of the operation on a display associated with the first user.

2. The system of claim 1, wherein processing the one or more specifications further comprises validating the first product model.

3. The system of claim 1, wherein the first policy instance comprises a policy between the first user and the first tenant.

4. The system of claim 1, wherein generating a first policy instance further comprises recording one or more policy generation operations performed in conjunction with the generation of the first policy instance.

5. The system of claim 1, wherein generating a first policy instance further comprises generating a first policy instance based on a selection originating from the user.

6. The system of claim 1, wherein generating a first policy instance further comprises storing the first product model in association with the first policy instance.

7. The system of claim 1, wherein generating a first policy instance further comprises generating a second policy instance with respect to a request originating from a second user.

8. The system of claim 1, wherein initiating an operation comprises initiating a product-defined operation on the associated policy.

9. The system of claim 1, wherein initiating an operation comprises initiating a rating operation with respect to the second request based on one or more rating parameters of the first product model.

10. The system of claim 1, wherein initiating an operation comprises initiating an underwriting operation with respect to the second request based on one or more underwriting parameters of the first product model.

11. A method comprising:
   obtaining one or more specifications related to a first insurance product, the specifications configured as one or more data structures containing processor-executable data elements representative of parameters of the first insurance product;
   obtaining tenant requirements of a first tenant, for one or more parameters of the first insurance product;
   processing the one or more specifications with respect to the tenant requirements to configure a first product model with respect to the first tenant, the first product model being a data structure storing a snapshot of parameters of the first insurance product at a first point in time, according to the requirements of the first tenant;
   storing the first product model in a product model store, the product model store configured as an object-oriented database;
   receiving a first request from a first user, the first request including data related to an insurance product;
   identifying the first product model based on the data of the first request;
   generating, using the first product model, a first policy instance based on at least the first request, the first policy instance representing the parameters of the first insurance product according to the requirements of the first tenant;
   receiving a second request from the first user, the second request comprising one or more changes to parameters of the first policy instance;
   in response to the second request, initiating a product-defined operation with respect to the first policy instance based on the association between the first policy instance and the first product model, to analyze the one or more changes to the parameters of the first policy instance; and displaying results of the operation on a display associated with the first user.

12. The method of claim 11, wherein processing the one or more specifications further comprises validating the first product model.

13. The method of claim 11, wherein the first policy instance comprises a policy between the first user and the first tenant.

14. The method of claim 11, wherein generating a first policy instance further comprises recording one or more policy generation operations performed in conjunction with the generation of the first policy instance.

15. The method of claim 11, wherein generating a first policy instance further comprises generating a first policy instance based on a selection originating from the user.

16. The method of claim 11, wherein generating a first policy instance further comprises storing the first product model in association with the first policy instance.

17. The method of claim 11, wherein generating a first policy instance further comprises generating a second policy instance with respect to a request originating from a second user.

18. The method of claim 11, wherein initiating an operation comprises initiating a rating operation with respect to the second request based on one or more rating parameters of the first product model.

19. The method of claim 11, wherein initiating an operation comprises initiating an underwriting operation with respect to the second request based on one or more underwriting parameters of the first product model.

20. A non-transitory computer readable medium having instructions stored thereon that, when executed by a processing device, cause the processing device to perform operations comprising:

obtaining one or more specifications related to a first insurance product, the specifications configured as one or more data structures containing processor-executable data elements representative of parameters of the first insurance product;

obtaining tenant requirements of a first tenant, for one or more parameters of the first insurance product;

processing the one or more specifications with respect to the tenant requirements to configure a first product model with respect to the first tenant, the first product model being a data structure storing a snapshot of parameters of the first insurance product at a first point in time, according to the requirements of the first tenant;

storing the first product model in a product model store, the product model store configured as an object-oriented database;

receiving a first request from a first user, the first request including data related to an insurance product;

identifying the first product model based on the data of first request;

generating, using the first product model, a first policy instance based on at least the first request, the first policy instance representing the parameters of the first insurance product according to the requirements of the first tenant;

receiving a second request from the first user, the second request comprising one or more changes to parameters of the first policy instance;

in response to the second request, initiating a product-defined rating operation with respect to the first policy instance based on the association between the first policy instance and one or more rating parameters reflected in the first product model, to analyze the one or more changes to the parameters of the first policy instance; and displaying results of the operation on a display associated with the first user.

\* \* \* \* \*

UNITED STATES PATENT AND TRADEMARK OFFICE
CERTIFICATE OF CORRECTION

Page 1 of 1

PATENT NO. : 12,217,310 B1
APPLICATION NO. : 17/124985
DATED : February 4, 2025
INVENTOR(S) : Jeffrey Tyler It is certified that error appears in the above-identified patent and that said Letters Patent is hereby corrected as shown below:

In the Claims

At Column 19, Line 67, the text "changes to the parameters of the first policy instance;" should read -- changes to the parameters of the first policy instance; and --.

Signed and Sealed this
Sixth Day of May, 2025

Coke Morgan Stewart
*Acting Director of the United States Patent and Trademark Office*